US012387371B2

(12) United States Patent
Tian et al.

(10) Patent No.: US 12,387,371 B2
(45) Date of Patent: Aug. 12, 2025

(54) POSE DETERMINING

(71) Applicant: BEIJING SANKUAI ONLINE TECHNOLOGY CO., LTD, Beijing (CN)

(72) Inventors: Mi Tian, Beijing (CN); Qiong Nie, Beijing (CN); Hao Shen, Beijing (CN); Huaxia Xia, Beijing (CN)

(73) Assignee: BEIJING SANKUAI ONLINE TECHNOLOGY CO., LTD, Beijing (CN)

( * ) Notice: Subject to any disclaimer, the term of this patent is extended or adjusted under 35 U.S.C. 154(b) by 680 days.

(21) Appl. No.: 17/705,754

(22) Filed: Mar. 28, 2022

(65) Prior Publication Data
US 2022/0309707 A1 Sep. 29, 2022

(30) Foreign Application Priority Data

Mar. 29, 2021 (CN) .......................... 202110329609.3

(51) Int. Cl.
G06T 7/73 (2017.01)
(52) U.S. Cl.
CPC ...... *G06T 7/74* (2017.01); *G06T 2207/30252* (2013.01)
(58) Field of Classification Search
CPC ............. G06T 7/74; G06T 2207/30252; G06T 2207/30244; G06F 16/583; G06F 18/22
See application file for complete search history.

(56) References Cited

U.S. PATENT DOCUMENTS

| 10,919,152 B1* | 2/2021 | Kalouche ............... B25J 9/1697 |
| 2011/0098860 A1* | 4/2011 | Yoshiike .............. B62D 57/032 |
| | | 901/1 |
| 2021/0019955 A1 | 1/2021 | Aga et al. |

FOREIGN PATENT DOCUMENTS

| CN | 106840148 A | 6/2017 | |
| CN | 109375626 A * | 2/2019 | ........... G05D 1/0246 |
| CN | 111288971 A * | 6/2020 | ............. G01C 11/02 |
| CN | 111489393 A | 8/2020 | |

(Continued)

OTHER PUBLICATIONS

The State Intellectual Property Office of People's Republic of China, First Office Action in Patent Application No. CN202110329609.3 issued on May 14, 2021, which is a foreign counterpart application corresponding to this U.S. Patent Application, to which this application claims priority.

(Continued)

*Primary Examiner* — Shaghayegh Azima
(74) *Attorney, Agent, or Firm* — Kolitch Romano Dascenzo Gates LLC

(57) ABSTRACT

First, environment image data acquired by an unmanned driving device is obtained, and for each piece of reference image data matching the environment image data, a predicted pose of the unmanned driving device when acquiring the environment image data is determined according to an actual pose corresponding to the reference image data; and then pose deviation representation information of the reference image data is determined according to the predicted pose and actual poses corresponding to other pieces of reference image data. Finally, target image data is selected from the reference image data, and a pose of the unmanned driving device when acquiring the environment image data is determined.

20 Claims, 3 Drawing Sheets

(56) References Cited

FOREIGN PATENT DOCUMENTS

| CN | 112013853 A | * | 12/2020 | ............. | G01C 21/28 |
| CN | 112288816 A | | 1/2021 | | |
| CN | 112462797 A | * | 3/2021 | ........... | G05D 1/0808 |

OTHER PUBLICATIONS

Ding, Mingyu, et al.; "CamNet: Coarse-to-Fine Retrieval for Camera Re-Localization", 2019 IEEE/CVF International Conference on Computer Vision (ICCV), pp. 2871-2880; 2019.

* cited by examiner

POSE DETERMINING

CROSS-REFERENCE TO RELATED APPLICATIONS

This application claims priority to Chinese Patent Application No. 202110329609.3, entitled "POSE DETERMINING METHOD AND APPARATUS" filed on Mar. 29, 2021, which is incorporated by reference in its entirety.

TECHNICAL FIELD

This application relates to the field of computer technologies, and in particular, to the computer technologies related to pose determining.

BACKGROUND

Currently, in the technical field of unmanned driving, pose data of an unmanned driving device is generally determined by using images acquired by the unmanned driving device, and then path planning and environmental perception are performed on the unmanned driving device by using the determined pose data.

SUMMARY

This application provides a pose determining method, a storage medium, and an electronic device, to improve the accuracy of determining a pose of an unmanned driving device when acquiring environment image data.

The following technical solutions are used in this application:

This application provides a pose determining method, including:
- obtaining environment image data acquired by an unmanned driving device;
- determining, for each piece of reference image data matching the environment image data and according to an actual pose corresponding to the reference image data, a predicted pose of the unmanned driving device when acquiring the environment image data;
- determining pose deviation representation information of the reference image data according to the predicted pose and actual poses corresponding to other pieces of reference image data, wherein the pose deviation representation information is used for representing degrees of deviation between poses of the unmanned driving device when acquiring the other pieces of reference image data and the actual poses corresponding to the other pieces of reference image data in a case that the unmanned driving device determines the predicted pose according to the reference image data; and
- selecting target image data from the reference image data according to the pose deviation representation information corresponding to the reference image data, and determining, according to the target image data, a pose of the unmanned driving device when acquiring the environment image data.

This application provides a non-transitory computer-readable storage medium storing a computer program, where the computer program, when being executed by a processor, implements the following steps:
- obtaining environment image data acquired by an unmanned driving device;
- determining, for each piece of reference image data matching the environment image data and according to an actual pose corresponding to the reference image data, a predicted pose of the unmanned driving device when acquiring the environment image data;
- determining pose deviation representation information of the reference image data according to the predicted pose and actual poses corresponding to other pieces of reference image data, where the pose deviation representation information is used for representing degrees of deviation between poses of the unmanned driving device when acquiring the other pieces of reference image data and the actual poses corresponding to the other pieces of reference image data in a case that the unmanned driving device determines the predicted pose according to the reference image data; and
- selecting target image data from the reference image data according to the pose deviation representation information corresponding to the reference image data, and determining, according to the target image data, a pose of the unmanned driving device when acquiring the environment image data.

This application provides an electronic device, including a memory, a processor, and a computer program stored in the memory and capable of being run on the processor, where when executing the program, the processor implements the following steps:
- obtaining environment image data acquired by an unmanned driving device;
- determining, for each piece of reference image data matching the environment image data and according to an actual pose corresponding to the reference image data, a predicted pose of the unmanned driving device when acquiring the environment image data;
- determining pose deviation representation information of the reference image data according to the predicted pose and actual poses corresponding to other pieces of reference image data, where the pose deviation representation information is used for representing degrees of deviation between poses of the unmanned driving device when acquiring the other pieces of reference image data and the actual poses corresponding to the other pieces of reference image data in a case that the unmanned driving device determines the predicted pose according to the reference image data; and
- selecting target image data from the reference image data according to the pose deviation representation information corresponding to the reference image data, and determining, according to the target image data, a pose of the unmanned driving device when acquiring the environment image data.

BRIEF DESCRIPTION OF THE DRAWINGS

The accompanying drawings described herein are used for providing a further understanding of this application, and form part of this application. Exemplary embodiments of this application and descriptions thereof are used for explaining this application, and do not constitute any inappropriate limitation to this application. In the accompanying drawings.

DETAILED DESCRIPTION

In the related art, a database stores a large quantity of images acquired by a specified acquisition device, and the database further records an actual pose corresponding to each image. For any image, an actual pose corresponding to the image is an actual pose of the specified acquisition device when acquiring the image. Based on the foregoing, in a process of determining a pose of an unmanned driving device, an image that is most similar to an environment image acquired by the unmanned driving device may be searched from the database, and then a relative pose between the unmanned driving device when the environment image is acquired and the unmanned driving device when the similar image is acquired is determined through image analysis. Finally, the pose of the unmanned driving device when acquiring the environment image is obtained by using the determined relative pose and an actual pose corresponding to the similar image recorded in the database.

However, in the method of the above related art, the image searched from the database may not be related to the acquired environment image, resulting in a large error in the obtained relative pose in data, and finally resulting in the relatively low accuracy of determining the pose of the unmanned driving device when acquiring the environment image.

Therefore, how to effectively improve the accuracy of pose data is a problem that urgently needs to be resolved.

This application provides a pose determining solution, which can improve the accuracy of determining a pose of an unmanned driving device when acquiring environment image data. The unmanned driving device can perform path planning and/or environmental perception based on the determined pose data.

The following describes the technical solution provided in each embodiment of this application in detail with reference to the accompanying drawings.

Figure 1:
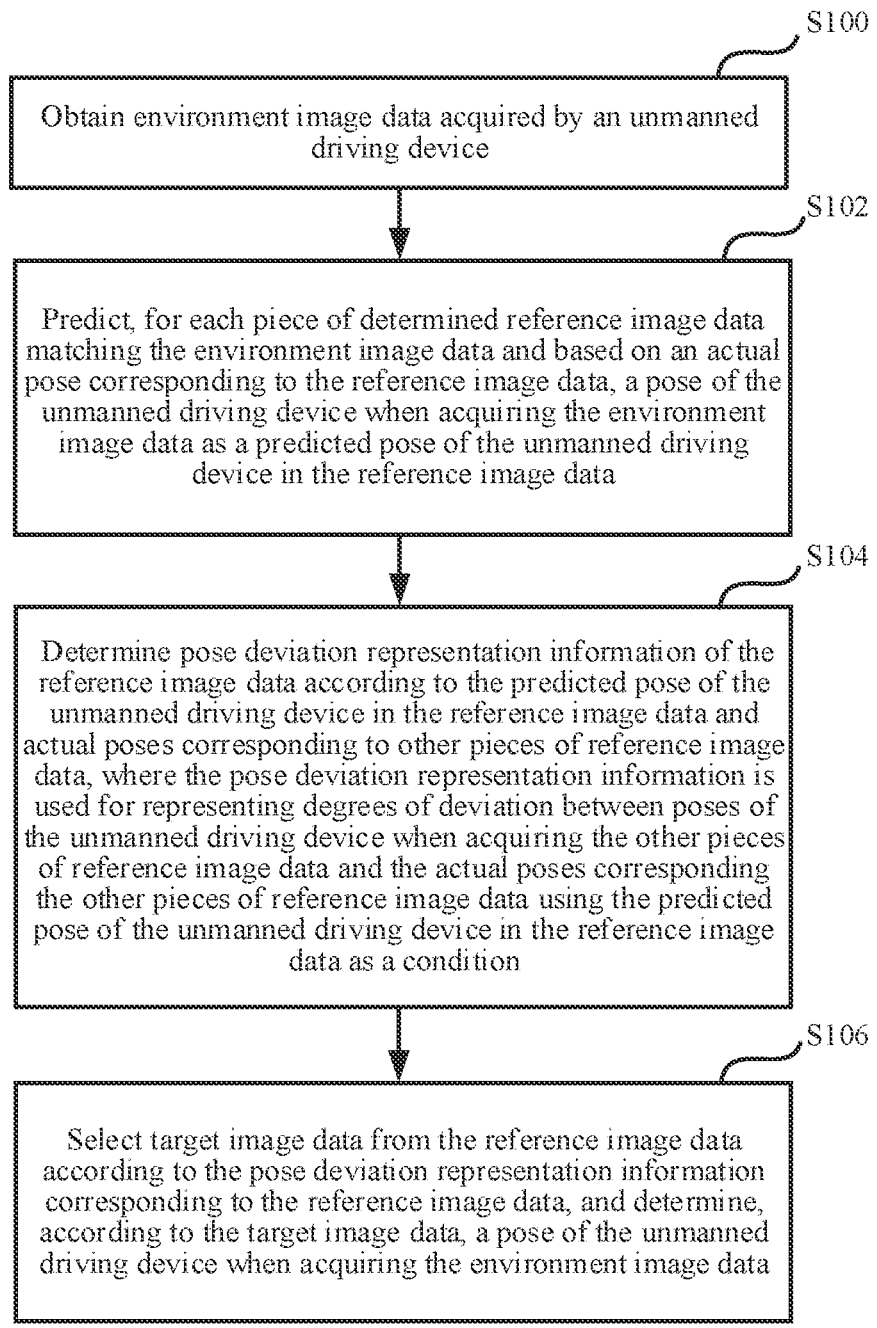
FIG. 1 is a schematic flowchart of a pose determining method according to an embodiment of this application.

FIG. 1 is a schematic flowchart of a pose determining method according to an embodiment of this application. The method includes the following steps.

S100. Obtain environment image data acquired by an unmanned driving device.

In this embodiment of this application, during movement, an unmanned driving device may acquire environment image data around the unmanned driving device. The environment image data may be data obtained by using a camera disposed on the unmanned driving device, and the camera may be any type of camera such as a wide-angle camera or a high-definition camera.

The unmanned driving device mentioned in this application may refers to a device such as an unmanned vehicle, a robot, or an automatic delivery device that can implement automated driving. Based on the foregoing, the unmanned driving device applying the pose determining method provided in this application may be configured to perform a delivery task in a delivery field, for example, a service scenario of performing delivery such as express, logistics, or take-out by using the unmanned driving device.

An execution body of the pose determining method provided in this application may be, for example, the unmanned driving device, or may be a terminal device such as a server or a desktop computer. If the terminal device such as the server or the desktop computer is the execution body, the terminal device may obtain the environment image data acquired by the unmanned driving device, determine a pose of the unmanned driving device when acquiring the environment image data, and then return determined pose data to the unmanned driving device. For ease of description, the following describes the pose determining method provided in this application by using only the unmanned driving device as the execution body.

S102. Predict, for each piece of determined reference image data matching the environment image data and based on an actual pose corresponding to the reference image data, a pose of the unmanned driving device when acquiring the environment image data as a predicted pose of the unmanned driving device in the reference image data.

That is, for each piece of reference image data matching the environment image data, the predicted pose of the unmanned driving device when acquiring the environment image data is determined according to the actual pose corresponding to the reference image data.

In this embodiment of this application, a preset database stores a plurality of pieces of historical environment image data acquired by a specified device in an early stage. In addition, the database further records an actual pose corresponding to each piece of historical environment image data. An actual pose corresponding to one piece of historical environment image data is a pose of the specified device when acquiring the historical environment image data, and the actual pose may be a pose calibrated manually.

Based on the foregoing, the unmanned driving device may determine each piece of reference image data matching the acquired environment image data from the database. Correspondingly, the unmanned driving device may predict, for each piece of determined reference image data and according to the reference image data, an actual pose corresponding to the reference image data, and the environment image data, a pose of the unmanned driving device when acquiring the environment image data as a predicted pose of the unmanned driving device in the reference image data.

In one or more embodiments, the unmanned driving device may predict, for each piece of determined reference image data matching the environment image data, a relative pose between the unmanned driving device when the environment image data is acquired and the unmanned driving device when the reference image data is acquired as a relative pose corresponding to the reference image data. That is, the unmanned driving device may predict, according to the environment image data and the reference image data, a pose relationship between a pose of the unmanned driving device when acquiring the environment image data and an actual pose corresponding to the reference image data, and then determine, according to the relative pose and the actual pose corresponding to the reference image data, the pose of the unmanned driving device when acquiring the environment image data.

That is, for each piece of reference image data matching the environment image data, the relative pose between the unmanned driving device when the environment image data is acquired and the unmanned driving device when the reference image data is acquired is predicted; and the predicted pose of the unmanned driving device when acquiring the environment image data is determined according to the relative pose and the actual pose corresponding to the reference image data.

In this embodiment of this application, there may be a plurality of methods for the unmanned driving device to determine each piece of reference image data matching environment image data. For example, the unmanned driving device may input environment image data into a feature extraction network, to obtain a feature vector corresponding to the environment image data, and input each piece of historical environment image data into the feature extraction network, to obtain a feature vector corresponding to each piece of historical environment image data. Subsequently, the unmanned driving device may match the feature vector corresponding to the environment image data with the feature vector corresponding to each piece of historical environment image data, to determine historical environment image data of which a similarity with the feature vector of the environment image data is greater than a set threshold in the feature vector of the historical environment image data as the reference image data.

The mentioned feature extraction network may be a conventional model such as a graph neural network (GNN) or a graph convolutional network (GCN). The feature extraction network is not limited herein.

In another example, the unmanned driving device may further input the feature vector corresponding to the environment image data into a pre-trained global pose prediction model, to predict a basic pose of the unmanned driving device when acquiring the environment image data, and match the basic pose with an actual pose corresponding to each piece of historical environment image data, to determine a plurality of pieces of historical environment image data of which actual poses are closest to the basic pose of the environment image data from the historical environment image data as the reference image data. The mentioned basic pose may refer to a predicted rough pose of the unmanned driving device and is used for matching reference image data of which an actual pose is close to a pose of the unmanned driving device when acquiring environment image data from the database.

That is, the environment image data is inputted into the global pose prediction model, to predict a basic pose of the unmanned driving device when acquiring the environment image data.

The mentioned global pose prediction model needs to be pre-trained. In one or more embodiments, the unmanned driving device obtains first historical environment image data acquired by a first specified device. The mentioned first specified device may refer to a device performing data acquisition in a model training process, for example, a human-driven vehicle, a human-operated robot, or another device.

For each piece of first historical environment image data, the first historical environment image data is inputted into a to-be-trained global pose prediction model, to predict a pose of the first specified device when acquiring the first historical environment image data, and the global pose prediction model is trained by using minimization of a deviation between the predicted pose of the first specified device when acquiring the first historical environment image data and an actual pose of the first specified device when acquiring the first historical environment image data as an optimization target. The pre-trained global pose prediction model may refer to a pose recognition model (PoseNet), a map recognition model (MapNet), or the like. The global pose prediction model is not limited herein.

In another example, the unmanned driving device may further input the feature vector corresponding to the environment image data into the pre-trained global pose prediction model, to predict a basic pose of the unmanned driving device when acquiring the environment image data, and then determine historical environment image data of which actual poses fall within a set range of the basic pose from a preset database as the reference image data matching the environment image data.

Image data of which actual poses are located near a predicted position of the unmanned driving device under a three-dimensional coordinate system, and in which an orientation of the unmanned driving device and a predicted orientation of the unmanned driving device are within a set range may be found from a preset database as candidate image data according to the basic pose of the unmanned driving device when acquiring the environment image data. The unmanned driving device may determine, from the candidate image data, image data of which an image similarity with the environment image data is not less than a set first similarity as the reference image data.

That is, a basic pose of the unmanned driving device when acquiring the environment image data is predicted according to the environment image data; candidate image data of which actual poses fall within a set range of the basic pose is determined from a database; and reference image data of which an image similarity with the environment image data is not less than a set first similarity is determined from the candidate image data.

In the mentioned process of determining a relative pose, the unmanned driving device may input, for each piece of reference image data matching the environment image data, the environment image data and the reference image data into a pre-trained relative pose prediction model, and predict a relative pose between the unmanned driving device when the environment image data is acquired and the unmanned driving device when the reference image data is acquired as a relative pose corresponding to the reference image data. Because reference image data stored in the database is not acquired by the unmanned driving device, the determined relative pose is actually used for representing a relative location relationship between the unmanned driving device when the environment image data is acquired and the unmanned driving device when it is assumed that the reference image data is acquired in a spatial location.

In this embodiment of this application, the mentioned relative pose prediction model needs to be pre-trained. In one or more embodiments, second historical environment image data acquired by a second specified device is obtained. The second specified device and the d first specified device may be the same acquisition device or may be different acquisition devices, and correspondingly, the first historical environment image data and second historical environment image data may be the same image data acquired by the same acquisition device or may be different image data acquired by different acquisition devices.

Subsequently, for each piece of second historical environment image data, other pieces of second historical environment image data of which similarities with the second historical environment image data are not less than a set second similarity may be determined from other pieces of second historical environment image data as associated historical environment image data corresponding to the second historical environment image data. The relative pose is determined based on an overlapping part between the second historical environment image data and the associated historical environment image data. Therefore, the associated historical environment image data actually found by determining a similarity is image data having the overlapping part with the second historical environment image data. The set second similarity and the set first similarity may be manually set according to an actual requirement and may be the same or may be different. This is not limited in this application.

There are a plurality of methods for determining a similarity, for example, a Euclidean distance and a cosine similarity. This is not limited in this application.

The unmanned driving device may determine an actual relative pose between the second specified device when the second historical environment image data is acquired and the second specified device when the associated historical environment image data is acquired, input the second historical environment image data and the associated historical environment image data into a to-be-trained relative pose prediction model, to obtain a predicted relative pose between the second specified device when the second historical environment image data is acquired and the second specified device when the associated historical environment image data is acquired, and then train the relative pose prediction model by using minimization of a deviation between the predicted relative pose and the actual relative pose as an optimization target. The pre-trained relative pose prediction model may refer to a coarse-to-fine retrieval model (CamNet), a relative pose model (Nnnet), or the like. The relative pose prediction model is not limited herein.

That is, a process of training the relative pose prediction model includes: obtaining second historical environment image data acquired by a second specified device; determining, for each piece of second historical environment image data, associated historical environment image data of which a similarity with the second historical environment image data is not less than a set second similarity from other pieces of second historical environment image data; determining an actual relative pose between the second specified device when the second historical environment image data is acquired and the second specified device when the associated historical environment image data is acquired, and inputting the second historical environment image data and the associated historical environment image data into a to-be-trained relative pose prediction model, to obtain a predicted relative pose between the second specified device when the second historical environment image data is acquired and the second specified device when the associated historical environment image data is acquired; and training the relative pose prediction model by using minimization of a deviation between the predicted relative pose and the actual relative pose as an optimization target.

S104. Determine pose deviation representation information of the reference image data according to the predicted pose of the unmanned driving device in the reference image data and actual poses corresponding to other pieces of reference image data, where the pose deviation representation information is used for representing degrees of deviation between poses of the unmanned driving device when acquiring the other pieces of reference image data and the actual poses corresponding to the other pieces of reference image data using the predicted pose of the unmanned driving device in the reference image data as a condition.

That is, the pose deviation representation information of the reference image data is determined according to the predicted pose and the actual poses corresponding to the other pieces of reference image data, where the pose deviation representation information is used for representing the degrees of deviation between the poses of the unmanned driving device when acquiring the other pieces of reference image data and the actual poses corresponding to the other pieces of reference image data in a case that the unmanned driving device determines the predicted pose according to the reference image data. In one or more embodiments, the degree of deviation may be represented by a deviation value.

Because an actual pose corresponding to each piece of reference image data in the database is relatively accurate, if a relative pose corresponding to each piece of reference image data determined in the process is accurate, the unmanned driving device may determine, based on any reference image data, a pose when acquiring the environment image data. In other words, if the relative pose corresponding to each piece of determined reference image data is accurate, the pose determined by the unmanned driving device based on any reference image data should be the same.

However, in an actual application, it cannot be effectively ensured that the relative pose corresponding to each piece of reference image data determined by using the relative pose prediction model is accurate. Therefore, it is required to be determined that a relative pose corresponding to which reference image data is accurate, and a pose of the unmanned driving device when acquiring environment image data is determined based on the reference image data.

Based on the foregoing, in this embodiment of this application, the unmanned driving device may determine the pose deviation representation information of the reference image data according to the predicted pose in the reference image data and the actual poses corresponding to the other pieces of reference image data. For each piece of the other pieces of reference image data, poses corresponding to the other pieces of reference image data are obtained according to relative poses between the other pieces of reference image data and the environment image data and a predicted pose of the environment image data corresponding to the reference image data.

Figure 2:
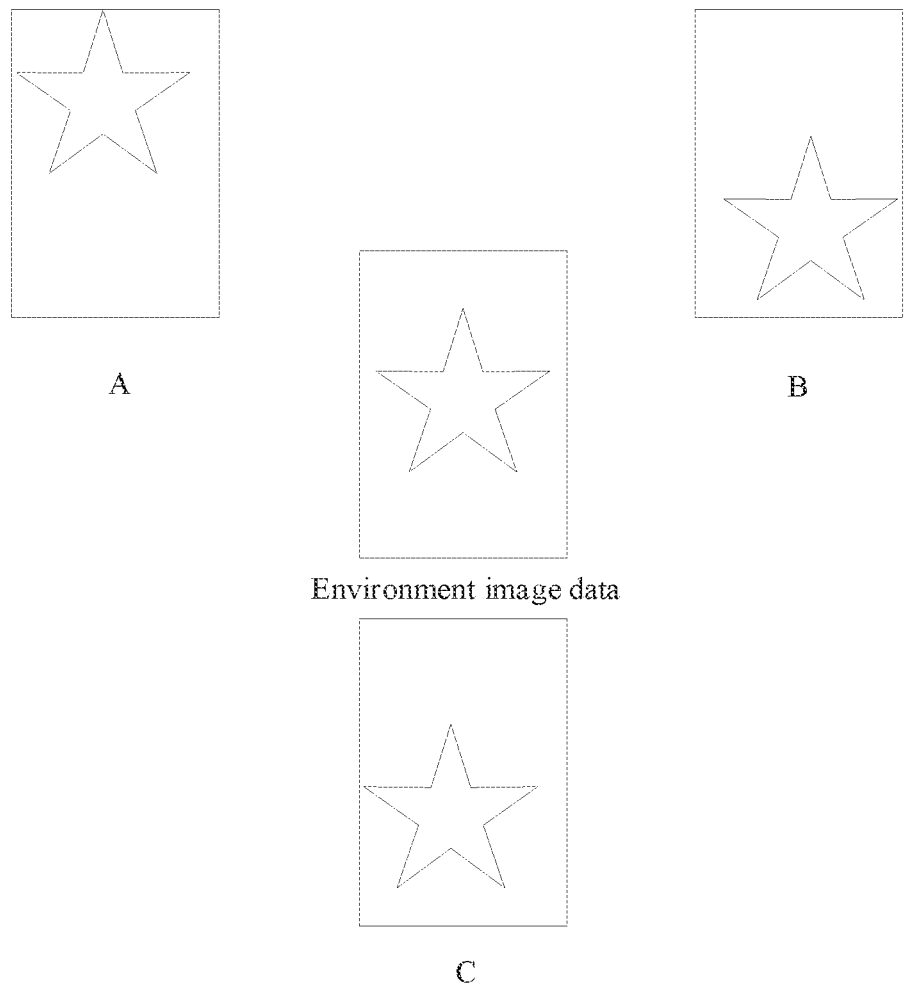
FIG. 2 is a schematic diagram of determining pose deviation representation information according to an embodiment of this application.

Further, the unmanned driving device may calculate the poses corresponding to the other pieces of reference image data and the actual poses corresponding to the other pieces of reference image data, to obtain degrees of deviation between the poses corresponding to the other pieces of reference image data and the actual poses corresponding to the other pieces of reference image data, so as to determine the pose deviation representation information of the reference image data, as shown in FIG. 2.

FIG. 2 is a schematic diagram of determining pose deviation representation information according to an embodiment of this application.

A, B, and C shown in FIG. 2 are respectively reference image data A, reference image data B, and reference image data C corresponding to environment image data acquired by an unmanned driving device, and pentagrams in A, B, and C are objects photographed in the image data. First, the unmanned driving device determines a relative pose between the reference image data A and the environment image data, a relative pose between the reference image data B and the environment image data, and a relative pose between the reference image data C and the environment image data. Subsequently, the unmanned driving device may determine a predicted pose corresponding to the environment image data based on the reference image data A according to an actual pose of the reference image data A and the relative pose corresponding to the reference image data A. Secondly, the unmanned driving device calculates the predicted pose corresponding to the environment image data and the relative pose corresponding to the reference image data B based on the reference image data A, to obtain a pose of the unmanned driving device when it is assumed that the reference image data B is acquired based on the reference image data A. Finally, a degree of deviation between the pose of the unmanned driving device when acquiring the reference image data B and an actual pose corresponding to the reference image data B is obtained according to the pose of the unmanned driving device when acquiring the reference image data B and the actual pose corresponding to the reference image data B. By analogy, a degree of deviation between a pose corresponding to the reference image data C and an actual pose corresponding to the reference image data C may be obtained based on the reference image data A, to determine pose deviation representation information of the reference image data A. The unmanned driving device may respectively obtain pose deviation representation information of the reference image data B and pose deviation representation information of the reference image data C in the same manner.

Certainly, the unmanned driving device may alternatively determine pose deviation representation information corresponding to each piece of reference image data by determining a deviation between relative poses. In one or more embodiments, the unmanned driving device may alternatively determine, based on the reference image data A, a pose of the unmanned driving device when it is assumed that the reference image data B is acquired, and determine, according to the actual pose corresponding to the reference image data B, a relative pose B' between the unmanned driving device when the environment image data is acquired and the unmanned driving device when it is assumed that the reference image data B is acquired. Subsequently, the unmanned driving device may determine a degree of deviation between the two relative poses according to the relative pose B' and a relative pose B determined by using the relative pose prediction model (that is, a relative pose between the unmanned driving device when the environment image data is acquired and the unmanned driving device when the reference image data B is acquired and determined by using the relative pose prediction model.

Similarly, the unmanned driving device may determine a degree of deviation between a relative pose C (that is, a relative pose between the unmanned driving device when the environment image data is acquired and the unmanned driving device when the reference image data C is acquired and determined by using the relative pose prediction model) and a relative pose C' (that is, a relative pose between the unmanned driving device when the environment image data is acquired and the unmanned driving device when it is assumed that the reference image data C is acquired), and then determine the pose deviation representation information of the reference image data A. By analogy, the unmanned driving device may respectively determine the pose deviation representation information of the reference image data B and the pose deviation representation information of the reference image data C in the same manner.

S106. Select target image data from the reference image data according to the pose deviation representation information corresponding to the reference image data, and determine, according to the target image data, a pose of the unmanned driving device when acquiring the environment image data.

In this embodiment of this application, the unmanned driving device may select target image data from the reference image data according to the pose deviation representation information corresponding to the reference image data, and determine, according to the target image data, a pose of the unmanned driving device when acquiring the environment image data.

For each piece of reference image data, the unmanned driving device may determine, according to the pose deviation representation information corresponding to the reference image data, a quantity of other pieces of reference image data meeting a preset condition using the predicted pose of the unmanned driving device in the reference image data as a condition. For each piece of the other pieces of reference image data, if degrees of deviation between actual poses corresponding to the other pieces of reference image data and poses of the unmanned driving device when acquiring the other pieces of reference image data are less than a set threshold, it is determined that the other pieces of reference image data meet the preset condition.

That is, for each piece of reference image data, a quantity of other pieces of reference image data meeting a preset condition is determined according to the pose deviation representation information corresponding to the reference image data when the unmanned driving device determines the predicted pose according to the reference image data, where the preset condition is that the degrees of deviation between the actual poses corresponding to the other pieces of reference image data and the poses of the unmanned driving device when acquiring the other pieces of reference image data are less than a set threshold; and the target image data is selected from the reference image data according to the quantity.

In this embodiment of this application, the unmanned driving device may further calculate relative poses according to the actual poses corresponding to the other pieces of reference image data and the predicted pose of the environment image data corresponding to the reference image data, calculate the relative poses and the relative pose corresponding to the reference image data, to obtain degrees of deviation between the calculated relative poses corresponding to the other pieces of reference image data and the relative pose corresponding to the reference image data, and determine that the other pieces of reference image data meet the preset condition if the degrees of deviation are less than the set threshold.

It can be learned from the above that the unmanned driving device determines the degrees of deviation between the actual poses corresponding to the other pieces of reference image data and the poses of the unmanned driving device when acquiring the other pieces of reference image data, to actually verify whether the relative pose determined by using the relative pose prediction model is accurate. That is, for any reference image data, if a relative pose (a relative pose between the unmanned driving device when the environment image data is acquired and the unmanned driving device when the reference image data is acquired) corresponding to the reference image data determined by using the relative pose prediction model (i.e., the relative pose determined by using the relative pose prediction model) is accurate, deviations between poses of the unmanned driving device when acquiring other pieces of reference image data and actual poses corresponding to the other pieces of reference image data determined based on the reference image data should be relatively small.

Therefore, the selected target image data is actually reference image data with a smallest relative pose determined by using the relative pose prediction model, that is, the relative pose corresponding to the target image data determined by using the relative pose prediction model (i.e., the relative pose determined by using the relative pose prediction model) is more accurate than that of other pieces of reference image data. Therefore, it can be ensured that it is determined that the pose of the unmanned driving device when acquiring the environment image data is more reasonable and accurate according to the target image data.

The foregoing describes the pose determining method provided in one or more embodiments of the application.

Figure 3:
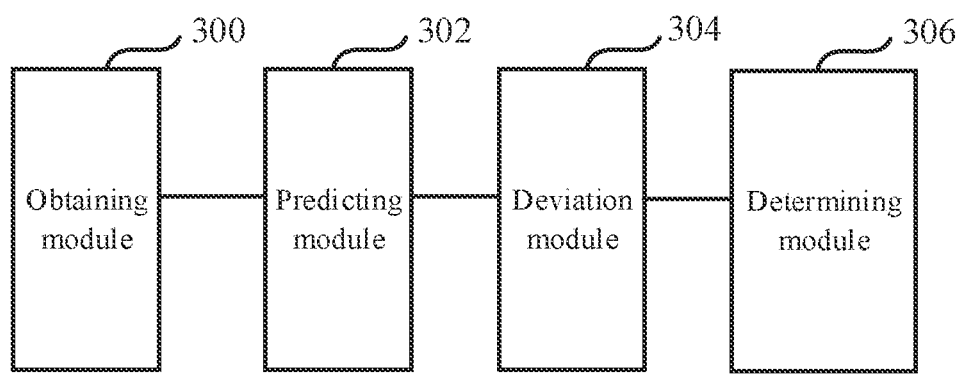
FIG. 3 is a schematic structural diagram of a pose determining apparatus according to an embodiment of this application.

Based on the same thought, the application further provides a corresponding pose determining apparatus, as shown in FIG. 3.

FIG. 3 is a schematic structural diagram of a pose determining apparatus according to an embodiment of this application. The apparatus includes:

- an obtaining module 300, configured to obtain environment image data acquired by an unmanned driving device;
- a predicting module 302, configured to determine, for each piece of reference image data matching the environment image data and according to an actual pose corresponding to the reference image data, a pose of the unmanned driving device when acquiring the environment image data;
- a deviation module 304, configured to determine pose deviation representation information of the reference image data according to the predicted pose and actual poses corresponding to other pieces of reference image data, where the pose deviation representation information is used for representing degrees of deviation between poses of the unmanned driving device when acquiring the other pieces of reference image data and the actual poses corresponding to the other pieces of reference image data in a case that the unmanned driving device determines the predicted pose according to the reference image data; and
- a determining module 306, configured to select target image data from the reference image data according to the pose deviation representation information corresponding to the reference image data, and determine, according to the target image data, a pose of the unmanned driving device when acquiring the environment image data.

Optionally, the predicting module 302 is configured to predict, for each piece of reference image data matching the environment image data, a relative pose between the unmanned driving device when acquiring the environment image data and the unmanned driving device when acquiring the reference image data, and determine, according to the relative pose and the actual pose corresponding to the reference image data, the predicted pose of the unmanned driving device when acquiring the environment image data.

Optionally, the predicting module 302 is configured to input, for each piece of reference image data matching the environment image data, the environment image data and the reference image data into a relative pose prediction model, and predict the relative pose between the unmanned driving device when the environment image data is acquired and the unmanned driving device when the reference image data is acquired.

Optionally, the predicting module 302 is configured to predict, according to the environment image data, a basic pose of the unmanned driving device when acquiring the environment image data; determine, from a database, candidate image data of which actual poses fall within a set range of the basic pose; and determine, from the candidate image data, reference image data of which an image similarity with the environment image data is not less than a set first similarity.

Optionally, the predicting module 302 is configured to input the environment image data into a global pose prediction model, to predict the basic pose of the unmanned driving device when acquiring the environment image data.

Optionally, the predicting module 302 is configured to obtain first historical environment image data acquired by a first specified device, input, for each piece of first historical environment image data, the first historical environment image data into a to-be-trained global pose prediction model, to predict a pose of the first specified device when acquiring the first historical environment image data, and train the global pose prediction model by using minimization of a deviation between the predicted pose and an actual pose of the first specified device when acquiring the first historical environment image data as an optimization target.

Optionally, the determining module 306 is configured to determine, for each piece of reference image data and according to the pose deviation representation information corresponding to the reference image data, a quantity of other pieces of reference image data meeting a preset condition in a case that the unmanned driving device determines the predicted pose according to the reference image data, where the preset condition is that the degrees of deviation between the actual poses corresponding to the other pieces of reference image data and the poses of the unmanned driving device when acquiring the other pieces of reference image data are less than a set threshold; and select the target image data from the reference image data according to the quantity.

Optionally, the predicting module 302 is configured to obtain second historical environment image data acquired by a second specified device, determine, for each piece of second historical environment image data, associated historical environment image data of which a similarity with the second historical environment image data is not less than a set second similarity from other pieces of second historical environment image data, determine an actual relative pose between the second specified device when the second historical environment image data is acquired and the second specified device when the associated historical environment image data is acquired, input the second historical environment image data and the associated historical environment image data into a to-be-trained relative pose prediction model, to obtain a predicted relative pose between the second specified device when the second historical environment image data is acquired and the second specified device when the associated historical environment image data is acquired, and train the relative pose prediction model by using minimization of a deviation between the predicted relative pose and the actual relative pose as an optimization target.

This application further provides a non-transitory computer-readable storage medium, storing a computer program. The computer program may be used for performing the foregoing pose determining method provided in FIG. 1.

Figure 4:
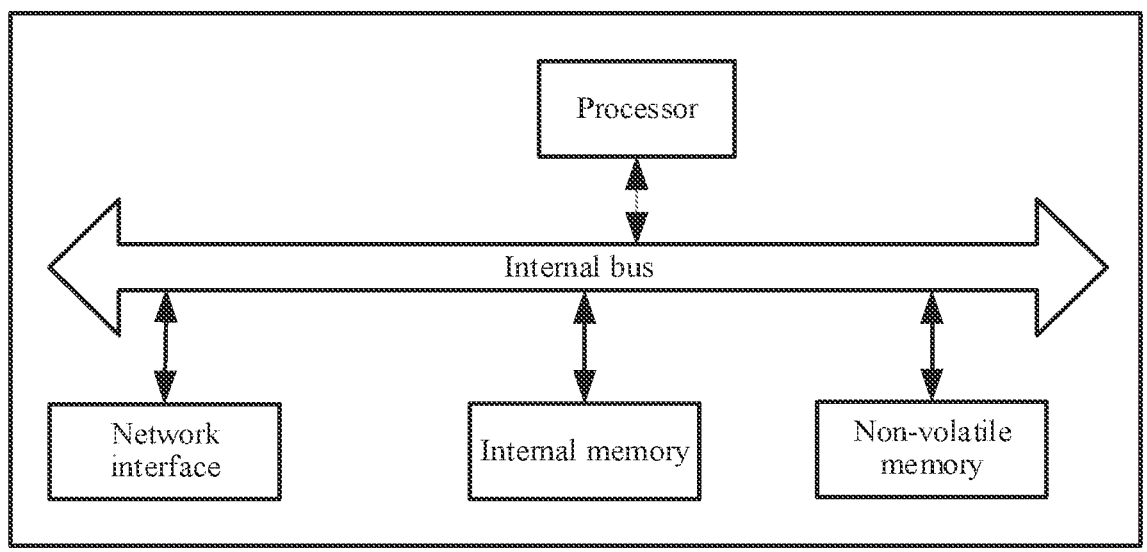
FIG. 4 is a schematic structural diagram of an electronic device according to an embodiment of this application.

This application further provides a schematic structural diagram of an electronic device, including a memory, a processor, and a computer program stored on the memory and capable of being run on the processor, the processor, when executing the program, implementing the pose determining method provided in FIG. 1. For example, as shown in FIG. 4, at a hardware level, the pose determining device includes a processor, an internal bus, a network interface, an internal memory, and a non-volatile memory, and may certainly further include hardware required for other services. The processor reads a corresponding computer program from a non-volatile memory into the memory and then runs the computer program, to implement the pose determining method in FIG. 1. Certainly, in addition to a software implementation, this application does not exclude another implementation, such as a logic device, or a combination of software and hardware. In other words, the execution body of the following processing flow is not limited to each logic unit, or may be hardware or the logic device.

In the 1990s, improvements of a technology can be clearly distinguished as hardware improvements (for example, improvements to a circuit structure such as a diode, a transistor, or a switch) or software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced Boolean expression language (ABEL), altera hardware description language (AHDL), Confluence, Cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that provided that a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20, and Silicone Labs C8051F320. The memory controller can also be implemented as part of the memory control logic. A person skilled in the art will also appreciate that, in addition to implementing the controller in the form of pure computer-readable program code, it is also possible to implement, by logically programming the method steps, the controller in the form of a logic gate, switch, ASIC, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments may be implemented by a computer chip or an entity, or implemented by a product having a certain function. A typical implementation device is a computer. The computer may be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, during implementation of this application, the function of the units may be implemented in the same piece of or multiple pieces of software and/or hardware.

A person skilled in the art should understand that the embodiments of this application may be provided as a method, a system, or a computer program product. Therefore, this application may use a form of hardware-only embodiments, software-only embodiments, or embodiments combining software and hardware. In addition, this application may use a form of a computer program product that is implemented on one or more computer-usable storage media (including but not limited to a disk memory, a CD-ROM, an optical memory, and the like) that include computer-usable program code.

This application is described with reference to flowcharts and/or block diagrams of the method, the device (system), and the computer program product according to the embodiments of this application. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can instruct a computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a memory.

The memory may include a form such as a volatile memory, a random-access memory (RAM) and/or a non-volatile memory such as a read-only memory (ROM) or a flash RAM in a computer-readable medium. The memory is an example of the computer-readable medium.

The computer-readable medium includes a non-volatile medium and a volatile medium, a removable medium and a non-removable medium, which may implement storage of information by using any method or technology. The information may be a computer-readable instruction, a data structure, a program module, or other data. Examples of a computer storage medium include but are not limited to a phase-change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette tape, a magnetic tape, a magnetic disk storage or other magnetic storage device, or any other non-transmission medium, which may be configured to store information accessible by a computing device. Based on the definition in this specification, the computer-readable medium does not include transitory computer-readable media (transitory media), such as a modulated data signal and a carrier.

The foregoing descriptions are merely embodiments of this application, and are not intended to limit this application. For a person skilled in the art, various modifications and variations can be made to this application. Any modification, equivalent replacement, or improvement made without departing from the spirit and principle of this application shall fall within the scope of the claims of this application.

What is claimed is:

1. A pose determining method, comprising:
obtaining environment image data acquired by an unmanned driving device;
determining, for each piece of reference image data matching the environment image data and according to an actual pose corresponding to the piece of reference image data, a pose of the unmanned driving device when acquiring the environment image data as a predicted pose of the unmanned driving device in the piece of reference image data;
determining pose deviation representation information of the piece of reference image data according to the predicted pose and actual poses corresponding to other pieces of reference image data, wherein the pose deviation representation information is used for representing degrees of deviation between poses of the unmanned driving device when acquiring the other pieces of reference image data and the actual poses corresponding to the other pieces of reference image data using the predicted pose of the unmanned driving device in the piece of reference image data as a condition; and
selecting target image data from respective pieces of reference image data according to the pose deviation representation information corresponding to the piece of reference image data, and determining, according to the target image data, a pose of the unmanned driving device when acquiring the environment image data.

2. The method according to claim 1, wherein the determining, for each piece of reference image data matching the environment image data and according to the actual pose corresponding to the piece of reference image data, the pose of the unmanned driving device when acquiring the environment image data as the predicted pose of the unmanned driving device in the piece of reference image data comprises:
predicting, for each piece of reference image data matching the environment image data, a relative pose between the unmanned driving device when the environment image data is acquired and the unmanned driving device when the piece of reference image data is acquired; and
determining, according to the relative pose and the actual pose corresponding to the piece of reference image data, the predicted pose of the unmanned driving device when acquiring the environment image data.

3. The method according to claim 2, wherein the predicting, for each piece of reference image data matching the environment image data, the relative pose between the unmanned driving device when the environment image data is acquired and the unmanned driving device when the piece of reference image data is acquired comprises:
inputting, for each piece of reference image data matching the environment image data, the environment image data and the piece of reference image data into a relative pose prediction model, and predicting the relative pose between the unmanned driving device when the environment image data is acquired and the unmanned driving device when the piece of reference image data is acquired.

4. The method according to claim 1, wherein determining each piece of reference image data matching the environment image data comprises:
predicting, according to the environment image data, a basic pose of the unmanned driving device when acquiring the environment image data;
determining, from a database, candidate image data of which actual poses fall within a set range of the basic pose; and
determining, from the candidate image data, reference image data of which an image similarity with the environment image data is not less than a set first similarity.

5. The method according to claim 4, wherein the predicting, according to the environment image data, the basic pose of the unmanned driving device when acquiring the environment image data comprises:
inputting the environment image data into a global pose prediction model, to predict the basic pose of the unmanned driving device when acquiring the environment image data.

6. The method according to claim 5, wherein training the global pose prediction model comprises:
obtaining first historical environment image data acquired by a first specified device;
inputting, for each piece of first historical environment image data, the first historical environment image data into a to-be-trained global pose prediction model, to predict a pose of the first specified device when acquiring the first historical environment image data; and
training the global pose prediction model by using minimization of a deviation between the predicted pose and an actual pose of the first specified device when acquiring the first historical environment image data as an optimization target.

7. The method according to claim 1, wherein the selecting target image data from the respective pieces of reference image data according to the pose deviation representation information corresponding to the piece of reference image data comprises:

determining, for each piece of reference image data and according to the pose deviation representation information corresponding to the piece of reference image data, a quantity of other pieces of reference image data meeting a preset condition in a case that the unmanned driving device determines the predicted pose according to the piece of reference image data, wherein the preset condition is that the degrees of deviation between the actual poses corresponding to the other pieces of reference image data and the poses of the unmanned driving device when acquiring the other pieces of reference image data are less than a set threshold; and selecting the target image data from the respective pieces of reference image data according to the quantity.

8. The method according to claim 3, wherein training the relative pose prediction model comprises:

obtaining second historical environment image data acquired by a second specified device;

determining, for each piece of second historical environment image data, associated historical environment image data of which a similarity with the second historical environment image data is not less than a set second similarity from other pieces of second historical environment image data;

determining an actual relative pose between the second specified device when the second historical environment image data is acquired and the second specified device when the associated historical environment image data is acquired;

inputting the second historical environment image data and the associated historical environment image data into a to-be-trained relative pose prediction model, to obtain a predicted relative pose between the second specified device when the second historical environment image data is acquired and the second specified device when the associated historical environment image data is acquired; and training the relative pose prediction model by using minimization of a deviation between the predicted relative pose and the actual relative pose as an optimization target.

9. A non-transitory computer-readable storage medium storing a computer program, wherein the computer program, when being executed by a processor, implements the following steps:

obtaining environment image data acquired by an unmanned driving device;

determining, for each piece of reference image data matching the environment image data and according to an actual pose corresponding to the piece of reference image data, a pose of the unmanned driving device when acquiring the environment image data as a predicted pose of the unmanned driving device in the piece of reference image data;

determining pose deviation representation information of the piece of reference image data according to the predicted pose and actual poses corresponding to other pieces of reference image data, wherein the pose deviation representation information is used for representing degrees of deviation between poses of the unmanned driving device when acquiring the other pieces of reference image data and the actual poses corresponding to the other pieces of reference image data using the predicted pose of the unmanned driving device in the piece of reference image data as a condition; and selecting target image data from respective pieces of reference image data according to the pose deviation representation information corresponding to the piece of reference image data, and determining, according to the target image data, a pose of the unmanned driving device when acquiring the environment image data.

10. The non-transitory computer-readable storage medium according to claim 9, wherein the computer program, when being executed by the processor, implements the following steps:

predicting, for each piece of reference image data matching the environment image data, a relative pose between the unmanned driving device when the environment image data is acquired and the unmanned driving device when the piece of reference image data is acquired; and determining, according to the relative pose and the actual pose corresponding to the piece of reference image data, the predicted pose of the unmanned driving device when acquiring the environment image data.

11. The non-transitory computer-readable storage medium according to claim 10, wherein the computer program, when being executed by the processor, implements the following steps:

inputting, for each piece of reference image data matching the environment image data, the environment image data and the piece of reference image data into a relative pose prediction model, and predicting the relative pose between the unmanned driving device when the environment image data is acquired and the unmanned driving device when the piece of reference image data is acquired.

12. The non-transitory computer-readable storage medium according to claim 9, wherein the computer program, when being executed by the processor, implements the following steps:

predicting, according to the environment image data, a basic pose of the unmanned driving device when acquiring the environment image data;

determining, from a database, candidate image data of which actual poses fall within a set range of the basic pose; and determining, from the candidate image data, reference image data of which an image similarity with the environment image data is not less than a set first similarity.

13. The non-transitory computer-readable storage medium according to claim 12, wherein the computer program, when being executed by the processor, implements the following steps:

inputting the environment image data into a global pose prediction model, to predict a basic pose of the unmanned driving device when acquiring the environment image data.

14. The non-transitory computer-readable storage medium according to claim 13, wherein the computer program, when being executed by the processor, implements the following steps:

obtaining first historical environment image data acquired by a first specified device;

inputting, for each piece of first historical environment image data, the first historical environment image data into a to-be-trained global pose prediction model, to predict a pose of the first specified device when acquiring the first historical environment image data; and training the global pose prediction model by using minimization of a deviation between the predicted pose and an actual pose of the first specified device when acquiring the first historical environment image data as an optimization target.

15. The non-transitory computer-readable storage medium according to claim 9, wherein the computer program, when being executed by the processor, implements the following steps:
determining, for each piece of reference image data and according to the pose deviation representation information corresponding to the piece of reference image data, a quantity of other pieces of reference image data meeting a preset condition in a case that the unmanned driving device determines the predicted pose according to the piece of reference image data, wherein the preset condition is that the degrees of deviation between the actual poses corresponding to the other pieces of reference image data and the poses of the unmanned driving device when acquiring the other pieces of reference image data are less than a set threshold; and
selecting the target image data from the respective pieces of reference image data according to the quantity.

16. The non-transitory computer-readable storage medium according to claim 11, wherein the computer program, when being executed by the processor, implements the following steps:
obtaining second historical environment image data acquired by a second specified device;
determining, for each piece of second historical environment image data, associated historical environment image data of which a similarity with the second historical environment image data is not less than a set second similarity from other pieces of second historical environment image data;
determining an actual relative pose between the second specified device when the second historical environment image data is acquired and the second specified device when the associated historical environment image data is acquired;
inputting the second historical environment image data and the associated historical environment image data into a to-be-trained relative pose prediction model, to obtain a predicted relative pose between the second specified device when the second historical environment image data is acquired and the second specified device when the associated historical environment image data is acquired; and
training the relative pose prediction model by using minimization of a deviation between the predicted relative pose and the actual relative pose as an optimization target.

17. An electronic device, comprising a memory, a processor, and a computer program stored in the memory and capable of being run on the processor, wherein when executing the program, the processor implements the following steps:
obtaining environment image data acquired by an unmanned driving device;
determining, for each piece of reference image data matching the environment image data and according to an actual pose corresponding to the piece of reference image data, a pose of the unmanned driving device when acquiring the environment image data as a predicted pose of the unmanned driving device in the piece of reference image data;
determining pose deviation representation information of the piece of reference image data according to the predicted pose and actual poses corresponding to other pieces of reference image data, wherein the pose deviation representation information is used for representing degrees of deviation between poses of the unmanned driving device when acquiring the other pieces of reference image data and the actual poses corresponding to the other pieces of reference image data using the predicted pose of the unmanned driving device in the piece of reference image data as a condition; and
selecting target image data from respective pieces of reference image data according to the pose deviation representation information corresponding to the piece of reference image data, and determining, according to the target image data, a pose of the unmanned driving device when acquiring the environment image data.

18. The electronic device according to claim 17, wherein when executing the program, the processor implements the following steps:
predicting, for each piece of reference image data matching the environment image data, a relative pose between the unmanned driving device when the environment image data is acquired and the unmanned driving device when the piece of reference image data is acquired; and
determining, according to the relative pose and the actual pose corresponding to the piece of reference image data, the predicted pose of the unmanned driving device when acquiring the environment image data.

19. The electronic device according to claim 18, wherein when executing the program, the processor implements the following steps:
inputting, for each piece of reference image data matching the environment image data, the environment image data and the piece of reference image data into a relative pose prediction model, and predicting the relative pose between the unmanned driving device when the environment image data is acquired and the unmanned driving device when the piece of reference image data is acquired.

20. The electronic device according to claim 17, wherein when executing the program, the processor implements the following steps:
predicting, according to the environment image data, a basic pose of the unmanned driving device when acquiring the environment image data;
determining, from a database, candidate image data of which actual poses fall within a set range of the basic pose; and
determining, from the candidate image data, reference image data of which an image similarity with the environment image data is not less than a set first similarity.

* * * * *